(12) United States Patent
Beyer et al.

(10) Patent No.: US 12,311,455 B2
(45) Date of Patent: May 27, 2025

(54) METHOD FOR SEPARATING A PLURALITY OF SLICES FROM WORKPIECES BY MEANS OF A WIRE SAW DURING A SEQUENCE OF SEPARATION PROCESSES

(71) Applicant: Siltronic AG, Munich (DE)

(72) Inventors: Axel Beyer, Seoul (KR); Patrick Berger, Freiberg (DE); Wolfgang Dietz, Dresden (DE); Carl Frintert, Muehldorf am Inn (DE); Matthias Guenther, Freiberg (DE)

(73) Assignee: SILTRONIC AG, Munich (DE)

( * ) Notice: Subject to any disclaimer, the term of this patent is extended or adjusted under 35 U.S.C. 154(b) by 427 days.

(21) Appl. No.: 18/008,986

(22) PCT Filed: May 27, 2021

(86) PCT No.: PCT/EP2021/064163
§ 371 (c)(1),
(2) Date: Dec. 8, 2022

(87) PCT Pub. No.: WO2021/249780
PCT Pub. Date: Dec. 16, 2021

(65) Prior Publication Data
US 2023/0278118 A1      Sep. 7, 2023

(30) Foreign Application Priority Data

Jun. 10, 2020  (EP) .................................. 20179200

(51) Int. Cl.
*B23D 57/00* (2006.01)
*B23D 59/00* (2006.01)
(Continued)

(52) U.S. Cl.
CPC ....... *B23D 57/0023* (2013.01); *B23D 59/002* (2013.01); *B23D 59/04* (2013.01);
(Continued)

(58) Field of Classification Search
CPC ............ B23D 57/0007; B23D 57/0023; B23D 57/0053; B23D 59/002; B23D 59/04;
(Continued)

(56) References Cited

U.S. PATENT DOCUMENTS 5,377,568 A   1/1995  Hauser
5,875,770 A   3/1999  Fukunaga
(Continued)

FOREIGN PATENT DOCUMENTS

CN   107052452 A   8/2017
DE   10064066 A1   5/2001
(Continued)

*Primary Examiner* — Joel D Crandall
(74) *Attorney, Agent, or Firm* — LEYDIG, VOIT & MAYER LTD.

(57) ABSTRACT

Slices are cut from workpieces during a sequence of cut-off operations by a wire saw, having a wire array. The wire array is tensioned in a plane between two wire guide rollers supported between fixed and floating bearings. During each cut-off operation, a workpiece is fed through the wire array perpendicular to a workpiece axis and the wire array plane. The workpiece is fed with simultaneous axial movement of the floating bearings by adjusting a temperature of the fixed bearings in correlation with a first correction profile, which specifies a travel of the floating bearings in dependence on the depth of cut. In dependence on the depth of cut, operating parameters are set, such as the feed rate, an amount of working fluid fed to the wire array per unit time, a temperature of the working fluid, a wire speed, a wire consumption per cut-off operation, or a wire tension.

12 Claims, 9 Drawing Sheets

(51) Int. Cl.
*B23D 59/04* (2006.01)
*B28D 5/00* (2006.01)
*B28D 5/04* (2006.01)

(52) U.S. Cl.
CPC .......... *B28D 5/0064* (2013.01); *B28D 5/0076* (2013.01); *B28D 5/045* (2013.01)

(58) Field of Classification Search
CPC .. B24D 5/045; B24D 5/0082; B24B 27/0633; B24B 55/02
See application file for complete search history.

(56) References Cited

U.S. PATENT DOCUMENTS

| | | | |
|---|---|---|---|
| 2002/0174861 A1 | 11/2002 | Lundt et al. | |
| 2009/0288530 A1* | 11/2009 | Oishi | B28D 5/007 83/22 |
| 2010/0089377 A1* | 4/2010 | Oishi | B28D 5/0064 125/16.02 |
| 2012/0240915 A1* | 9/2012 | Huber | B23D 57/0053 125/21 |
| 2013/0139800 A1* | 6/2013 | Zavattari | B28D 5/045 125/12 |
| 2013/0139801 A1* | 6/2013 | Zavattari | B28D 5/0064 125/12 |
| 2013/0144421 A1* | 6/2013 | Zavattari | B28D 5/045 125/12 |
| 2013/0206126 A1* | 8/2013 | Pietsch | B28D 5/0076 125/21 |
| 2015/0314484 A1 | 11/2015 | Pietsch | |

FOREIGN PATENT DOCUMENTS

| | | |
|---|---|---|
| DE | 102004043718 A | 3/2006 |
| DE | 102011005949 A1 | 9/2012 |
| JP | 2005103683 A | 4/2005 |
| TW | 201336652 A | 9/2013 |
| WO | WO 201379683 A1 | 6/2013 |

* cited by examiner

METHOD FOR SEPARATING A PLURALITY OF SLICES FROM WORKPIECES BY MEANS OF A WIRE SAW DURING A SEQUENCE OF SEPARATION PROCESSES

CROSS REFERENCE TO RELATED APPLICATIONS

This application is a U.S. National Phase application under 35 U.S.C. § 371 of International Application No. PCT/EP2021/064163, filed on May 27, 2021, and claims benefit to European Patent Application No. EP 20179200.9, filed on Jun. 10, 2020. The International Application was published in German on Dec. 16, 2021 as WO 2021/249780 A1 under PCT Article 21(2).

FIELD

The present disclosure relates to a method for cutting a multiplicity of slices by means of a wire saw from workpieces during a sequence of cut-off operations.

BACKGROUND

A method for cutting a multiplicity of slices can be accomplished by means of lap slicing or grind slicing.

In the case of lap slicing, working fluid in the form of a slurry consisting of hard materials in a liquid carrier medium is fed to the working space formed between the wire surface and the workpiece. In the case of lap slicing, material is removed by means of a three-body interaction involving the tool carrier (saw wire), the tool (abrasive) and the workpiece.

In the case of grind slicing, use is made of saw wire in whose surface hard materials are firmly bonded, and a working fluid is supplied which itself contains no abrasive materials and acts as a cooling lubricant. In the case of grind slicing, material is removed by means of two body interaction involving a diamond-coated saw wire as a tool and the workpiece.

In the case of conventional wire saws, each of the wire guide rollers is provided in the vicinity of each of its end faces with a bearing which is connected in a fixed manner to the machine frame and is referred to as a fixed bearing, and is provided in the vicinity of the opposite end face with a bearing which is movable in the axial direction of the wire guide roller relative to the machine frame and is referred to as a floating bearing.

There are measures which aim to counteract the change in the arrangement of the wire array and the workpiece relative to one another during the cut-off operation in order to improve the plane parallelism of the main surfaces of the slices to be cut off.

U.S. Pat. No. 5,377,568 discloses a method in which the position of a reference surface situated on the outside of the wire guide roller relative to the machine frame is measured, and a thermal length increase or length decrease in the wire guide roller is brought about by adjusting the temperature of the wire guide roller interior until the measured position change of the reference surface has been compensated again.

WO 2013/079683 A1 discloses a method in which, first of all, the slice shapes obtained at various temperatures of the wire guide roller bearings are measured, and each of these shapes is stored with the respectively associated bearing temperature, and, in the follow-on cut, the bearing temperature which best matches the desired target shape is then selected.

U.S. Pat. No. 5,875,770 discloses a method in which the shape of slices from a cut is measured, a cut depth-dependent correction curve is calculated by forming the difference with respect to a desired ideal shape of the slices, and, in the following cut, the workpiece is moved in the axial direction relative to the wire array in accordance with this correction curve during the cut-off operation.

US 2002/0 174 861 A1 describes a method which envisages control of the temperature of the workpiece in order to limit the warp of slices that are cut off.

Despite these measures, the inventors have recognized that there continues to be a need for improvements, on the one hand because these measures have only a limited effect and, on the other hand, because the requirements in respect of flatness and plane parallelism of slices are becoming ever more demanding, especially in the semiconductor industry.

SUMMARY

In an embodiment, the present disclosure provides a method that cuts a multiplicity of slices, using a wire saw, from workpieces during a sequence of cut-off operations divided into initial cuts and follow-on cuts. The wire saw has a wire array of moving wire sections of a saw wire and an actuating device. The wire array is tensioned in a plane between two wire guide rollers, each of the two wire guide rollers being supported between a fixed bearing and a floating bearing. During each of the cut-off operations, a respective workpiece, of the workpieces, is fed at a feed rate, using the actuating device, through the wire array along a feed direction perpendicular to a workpiece axis and perpendicular to the plane of the wire array in the presence of a working fluid and hard materials, which act abrasively on the workpiece. The feeding of the workpiece through the wire array further includes: during each of the cut-off operations, feeding the workpiece through the wire array with simultaneous axial movement of the floating bearings by adjusting a temperature of the fixed bearings with a cooling fluid in accordance with a specification of a first temperature profile, which specifies a temperature of the cooling fluid in dependence on a depth of cut and correlates with a first correction profile, which specifies a travel of the floating bearings in dependence on the depth of cut. A shape deviation is determined during each of the cut-off operations and/or before each of the cut-off operations. In dependence on the depth of cut, operating parameters are set, and may include the feed rate, an amount of working fluid fed to the wire array per unit time, a temperature of the working fluid, a wire speed, a wire consumption per cut-off operation, or a wire tension.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
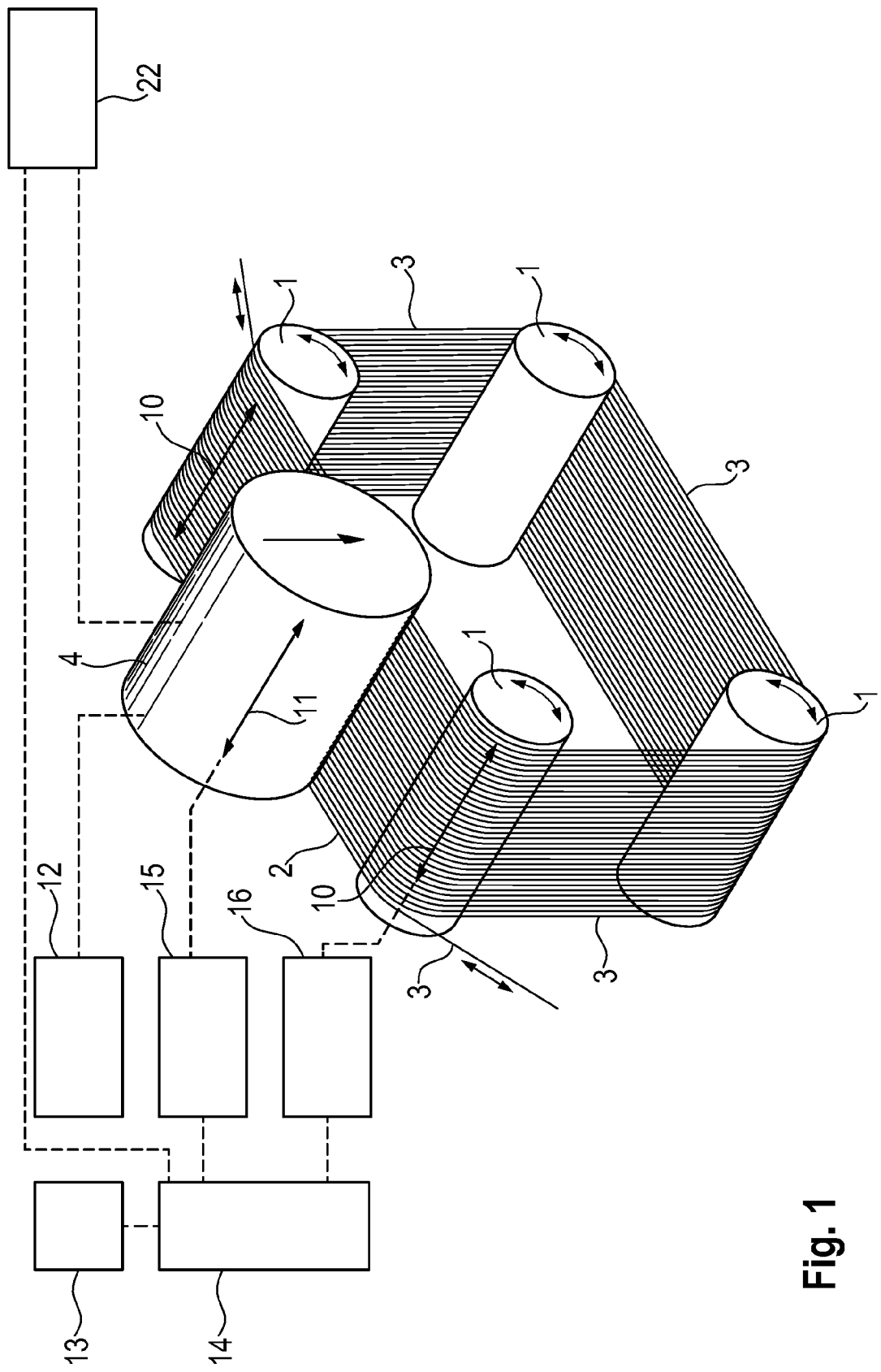
FIG. 1 shows schematically features of a wire saw that play a role in the use of the present disclosure.

The present disclosure relates to a method for cutting a multiplicity of slices by means of a wire saw from workpieces during a sequence of cut-off operations, wherein the wire saw comprises a wire array of moving wire sections of a saw wire and an actuating device, and the wire array is tensioned in a plane between two wire guide rollers, and wherein each of the two wire guide rollers is supported between a fixed bearing and a floating bearing. During each of the cut-off operations, the respective workpiece is fed by means of the actuating device through the wire array along a feed direction perpendicular to a workpiece axis and perpendicular to the plane of the wire array in the presence of a working fluid and hard materials, which act abrasively on the workpiece.

Aspects of the present disclosure make available slices whose shape matches a target shape as closely as possible.

According to a first embodiment, the present disclosure provides a method for cutting a multiplicity of slices by means of a wire saw from workpieces during a sequence of cut-off operations divided into initial cuts and follow-on cuts, wherein the wire saw comprises a wire array of moving wire sections of a saw wire and an actuating device, and the wire array is tensioned in a plane between two wire guide rollers, wherein each of the two wire guide rollers is supported between a fixed bearing and a floating bearing, the method comprising during each of the cut-off operations, feeding the respective workpiece at a feed rate by means of the actuating device through the wire array along a feed direction perpendicular to a workpiece axis and perpendicular to the plane of the wire array in the presence of a working fluid and hard materials, which act abrasively on the workpiece, which comprises during each of the cut-off operations, feeding the workpiece through the wire array with simultaneous axial movement of the floating bearings by adjusting the temperature of the fixed bearings with a cooling fluid in accordance with the specification of a first temperature profile, which specifies the temperature of the cooling fluid in dependence on a depth of cut and correlates with a first correction profile, which specifies the travel of the floating bearings in dependence on the depth of cut; determining the shape deviation during each of the cut-off operations and/or before each of the cut-off operations; and in dependence on the depth of cut, setting operating parameters such as the feed rate, the amount of working fluid fed to the wire array per unit time, the temperature of the working fluid, the wire speed, the wire consumption per cut-off operation and the wire tension.

According to a second embodiment, the present disclosure provides a method for cutting a multiplicity of slices by means of a wire saw from workpieces during a sequence of cut-off operations divided into initial cuts and follow-on cuts, wherein the wire saw comprises a wire array of moving wire sections of a saw wire and an actuating device, and the wire array is tensioned in a plane between two wire guide rollers, wherein each of the two wire guide rollers is supported between a fixed bearing and a floating bearing, the method comprising during each of the cut-off operations, feeding the respective workpiece at a feed rate by means of the actuating device through the wire array along a feed direction perpendicular to a workpiece axis and perpendicular to the plane of the wire array in the presence of a working fluid and hard materials, which act abrasively on the workpiece, which comprises feeding the workpiece through the wire array while simultaneously moving the workpiece along the workpiece axis by means of an actuating element in accordance with the specification of a second correction profile, which specifies the travel of the workpiece, wherein the second correction profile is opposed to a shape deviation; determining the shape deviation during each of the cut-off operations and/or before each of the cut-off operations; and in dependence on the depth of cut, setting operating parameters such as the feed rate, the amount of working fluid fed to the wire array per unit time, the temperature of the working fluid, the wire speed, the wire consumption per cut-off operation and the wire tension.

According to a third embodiment, the present disclosure provides a method for cutting a multiplicity of slices by means of a wire saw from workpieces during a sequence of cut-off operations divided into initial cuts and follow-on cuts, wherein the wire saw comprises a wire array of moving wire sections of a saw wire and an actuating device, and the wire array is tensioned in a plane between two wire guide rollers, wherein each of the two wire guide rollers is supported between a fixed bearing and a floating bearing, the method comprising during each of the cut-off operations, feeding the respective workpiece at a feed rate by means of the actuating device through the wire array along a feed direction perpendicular to a workpiece axis and perpendicular to the plane of the wire array in the presence of a working fluid and hard materials, which act abrasively on the workpiece, which comprises during each of the cut-off operations, feeding the workpiece through the wire array with simultaneous axial movement of the floating bearings by adjusting the temperature of the fixed bearings with a cooling fluid in accordance with the specification of a first temperature profile, which specifies the temperature of the cooling fluid in dependence on a depth of cut and correlates with a first correction profile, which specifies the travel of the floating bearings in dependence on the depth of cut; feeding the workpiece through the wire array while simultaneously moving the workpiece along the workpiece axis by means of an actuating element in accordance with the specification of a second correction profile, which specifies the travel of the workpiece, wherein the first and second correction profiles are opposed to a shape deviation; determining the shape deviation during each of the cut-off operations and/or before each of the cut-off operations; and in dependence on the depth of cut, setting operating parameters such as the feed rate, the amount of working fluid fed to the wire array per unit time, the temperature of the working fluid, the wire speed, the wire consumption per cut-off operation and the wire tension.

The method according to the first, second, and third embodiments can be configured as lap slicing or grind slicing. Depth of cut (doc) denotes a length counter to the feed direction in the region of the entry cut into the workpiece as far as the exit cut from the workpiece.

It has been found that the combination of changing the relative position of the workpiece and wire sections of the wire array according to a first and/or second correction profile and setting operating parameters such as the feed rate, the amount of working fluid supplied to the wire array per unit time, the temperature of the working fluid, the wire speed, the wire consumption per cut-off operation and the wire tension is particularly suitable for achieving the matching of a target shape as closely as possible, provided that the operating parameters are matched to these applications.

Feeding the workpiece through the wire array during each of the cut-off operations while controlling the temperature of the workpiece by wetting the workpiece with a cooling medium is furthermore advantageous, irrespective of whether operating in accordance with the first, second or third embodiment.

Adjusting the temperature of the fixed bearings (referred to below as wire guide temperature control, WGTC) leads to contraction or expansion of the fixed bearings and hence of the components thereof in the axial direction of the wire guide rollers, resulting in axial movement of the floating bearings and thus movement of the wire guide rollers relative to the workpiece.

Adjusting the temperature of the fixed bearings has the same effect qualitatively as moving the workpiece (referred to below as ingot positioning control, IPC) along the workpiece axis by means of an actuating element. The actuating element is preferably a piezoelectric actuator. The variables which bring about the respective travel are thus the temperature of the cooling fluid in the case of WGTC, and the signal used to drive the actuating element in the case of IPC.

Wetting the workpiece with a cooling medium (ingot cooling, IC) can cause a change in the length of the workpiece and hence likewise a relative movement between the workpiece and the wire sections of the wire array.

According to the first embodiment of the present disclosure, WGTC is carried out with operating parameters matched thereto, according to the second embodiment IPC is carried out with operating parameters matched thereto, and according to the third embodiment WGTC and IPC are carried out with operating parameters matched thereto.

Irrespective of which of the three embodiments is employed, the matched operating parameters are the following:

The feed rate at which the workpiece is fed through the wire array is preferably no less than 2.6 mm/min and no more than 4.25 mm/min, particularly preferably no less than 2.6 mm/min and no more than 3.4 mm/min.

The amount of working fluid fed to the wire array per unit time is preferably no less than 15 kg/min and no more than 42 kg/min, particularly preferably no less than 34 kg/min and no more than 42 kg/min.

The temperature of the working fluid is preferably no less than 20° C. and no more than 34° C., particularly preferably no less than 28° C. and no more than 34° C.

The wire speed at which the wire sections are moved is preferably no less than 6 m/s and no more than 14 m/s, particularly preferably no less than 6 m/s and no more than 10 m/s.

The wire tension is preferably no less than 25 N and no more than 35 N.

The wire consumption per cut-off operation is preferably no less than 50 km and no more than 72 km, particularly preferably no less than 50 km and no more than 70 km.

The third embodiment is particularly preferable because it provides for the use of WGTC and IPC in combination with the matched operating parameters to minimize any possible shape deviation. There are particular advantages associated with this approach. If the WGTC and IPC measures are used in combination, it is possible to achieve an amplitude (amount of travel) of movement of the wire guide rollers relative to the workpiece that is greater than the amplitude possible when using only one of the measures. The range within which the movement of the floating bearings and the workpiece is linearly dependent on the variable bringing about the movement is wider than the corresponding range available when using only one of the measures. From changing the variable that brings about the movement to the actual occurrence of the movement takes significantly more response time in the case of WGTC than in the case of IPC, especially if the actuating element is a piezoelectric actuator. Thus, the two measures have different control bandwidths. Accordingly, it is advantageous to counter comparatively high-frequency shape deviations, i.e. shape deviations that change with comparatively large gradients depending on the depth of cut, by means of IPC and comparatively low-frequency shape deviations by means of WGTC. Because of the different response times, control by IPC can be used to damp overshoot of control by WGTC. In addition, the control bandwidth of the combination of IPC and WGTC is larger than that of IPC or of WGTC. The combination of both measures makes it possible to achieve a larger travel per unit time, because the movement of the floating bearings and the workpiece is carried out by two independent actuators.

If the shape deviation is determined before a cut-off operation, the term shape deviation refers to the deviation of a shape profile of a slice or an average shape profile of slices from a reference shape profile.

If the shape deviation is determined during a cut-off operation, the term shape deviation refers to the deviation of the position of a line through the center of an observed kerf or the deviation of the position of an average line representing a plurality of such lines from the position of a reference trajectory. This line and the reference trajectory would have the same position with respect to a common reference if the cut-off operation were completely trouble-free, i.e. without unintentional axial movement of the wire guide rollers and/or axial movement of the workpiece. The common reference is a location in space that remains motionless, e.g. a location on the machine frame. If a plurality of kerfs is observed, the locations of the lines through the centers of the kerfs are averaged to give the location of an average line. Points at the same height of the line or the average line and the reference trajectory represent a certain depth of cut. Accordingly, the distance of such a point on the line or on the average line from the corresponding point on the reference trajectory indicates the shape deviation at the depth of cut represented by the points.

Observation of one or more kerfs is preferably performed by irradiation with optical radiation, IR radiation, X-rays, or y-rays. In addition, mechanical scanning of the kerfs or inductive or capacitive measurement of the kerfs may also be considered.

The shape deviation is determined during each of the cut-off operations and/or before each of the cut-off operations.

According to a variant of the third embodiment, determination of the shape deviation is based on observing one or more kerfs during a cut-off operation, and two closed control loops are established. The first control loop responds to a control error, i.e. to a determined shape deviation, by means of WGTC, and the second control loop responds by means of IPC, wherein the movement of the floating bearings and of the workpiece which is to be performed to rectify the shape deviation is carried out with the work divided between the loops. The floating bearings are moved by means of WGTC according to a first correction profile, which determines the travel of the floating bearings in dependence on the depth of cut. The first temperature profile, which specifies the temperature of the coolant in dependence on a depth of cut, correlates with the first correction profile. It is experimentally determined in advance what temperature change of the cooling fluid is required to bring about the specified travel of the floating bearing of the respective wire guide roller. The first correction profile determines, in dependence on the depth of cut, the proportion of travel that the floating bearings perform in order to reduce the shape deviation. The workpiece is moved by means of IPC in accordance with a second correction profile. The second correction profile determines, in dependence on the depth of cut, the proportion of travel that the workpiece performs in order to reduce the shape deviation. The sum of both proportions corresponds to the travel required to reduce the determined shape deviation. The proportions of travel can be divided equally or differently. A further proportion of relative movement between the workpiece and the wire sections of the wire array is preferably taken into account in the form of a third correction profile, which specifies a change in length of the workpiece in dependence on the depth of cut. The change in length is brought about by wetting the workpiece with a cooling medium (ingot cooling, IC).

According to a further variant of the third embodiment, the determination of the shape deviation is based on a comparison of an average shape profile of already cut-off slices with a reference shape profile, the comparison provides an overall correction profile which, even before a cut-off operation, determines what travel is necessary in dependence on the depth of cut in order to avoid the shape deviation which, in view of the comparison, would be expected without countermeasures. The overall correction profile is divided into the first and second and, where applicable, the third correction profile, and this determines what proportions of travel are to be performed by means of WGTC and IPC and, where applicable, of change in length of the workpiece by means of IC. In this case, too, the proportions of travel and change in length of the workpiece can be divided equally or in some other ratio.

According to a further variant of the third embodiment, WGTC and IPC are employed to counter a shape deviation, the determination of which is performed during each of the cut-off operations, and IC is employed to counter a shape deviation which is determined before each of the cut-off operations, or vice versa.

According to a further variant of the third embodiment, WGTC and IC are employed to counter a shape deviation, the determination of which is performed during each of the cut-off operations, and IPC is employed to counter a shape deviation which is determined before each of the cut-off operations, or vice versa.

According to a further variant of the third embodiment, IPC and IC are employed to counter a shape deviation, the determination of which is performed during each of the cut-off operations, and WGTC is employed to counter a shape deviation which is determined before each of the cut-off operations, or vice versa.

The surface of a slice is composed of the main surfaces and the edge surface. The main surfaces comprise the front side and the rear side of the slice. A slice can be measured by being arranged between a pair of sensors, as is customary in the case of warp measurement. Each of the sensors measures the distance of the facing main surface of the slice at measurement points. The measurement points can be distributed over the main surfaces or can lie along a diameter of the slice that deviates by no more than ±20° from the feed direction. The measurement points preferably lie with position i along the diameter of the slice, to be specific counter to the feed direction, and therefore each measurement point is associated with a particular depth of cut. The density of the measurement points is preferably no less than 1 per cm, and the distance between one measurement point and the nearest adjacent point is preferably the same for all the measurement points.

The shape profile of a slice is the line which connects the measurement points si, which are calculated at the positions i in accordance with the rule $si=D-(FDi-BDi)$, where D is the distance between the sensors, FDi is the distance between the upper sensor and the respective measurement point on the front side of the slice, and BDi is the distance between the lower sensor and the respective measurement point on the rear side of the slice. It should be noted that aspects of the present disclosure can also be carried out using an alternative definition of the shape profile, as long as this alternative definition encodes the shape of the slice in dependence on the depth of cut.

An average shape profile of slices is a shape profile obtained by averaging the shape profiles of a plurality of slices. A reference shape profile is a desired shape profile, preferably the shape profile of a slice which has completely flat and mutually parallel main surfaces. The average shape profile is determined for slices which result from preferably at least 1 to 5 cut-off operations by means of the same wire saw, wherein these cut-off operations have immediately preceded the cut-off operation to be carried out by this wire saw. The selection of slices for the creation of the average shape profile can be slice-based or cut-based, or can include both. In the case of slice-based selection, certain slices from a cut-off operation are used to determine the respective average shape profile by averaging, and others are excluded. For example, only those slices are taken into account in the averaging process that have a specific position in the workpiece, e.g. only every 15th to 25th slice along the workpiece axis. Another possibility for slice-based selection is the exclusion of slices with the largest and the smallest deviation of the shape profile from the average shape profile of all slices in the cut-off operation (so-called trimmed mean). Alternatively, it is possible to exclude from averaging slices whose shape profile deviates from the average shape profile of all slices in the cut-off operation by more than 1 to 2 sigma. In a cut-based selection, all slices from at least one cut-off operation are used to determine an average shape profile and all slices from at least one other cut-off operation are excluded from it.

The average shape profile of slices in a cut-off operation changes over the course of a sequence of cut-off operations. Changes are preferably used to evaluate the performance of the wire saw. They may indicate wear of the saw wire and/or the facing of the wire guide rollers or of any other component of the wire saw that is subject to wear. Preferably, therefore, a threshold for the shape deviation is defined which, when reached or exceeded, initiates maintenance activities (predictive maintenance activities) instead of a further cut-off operation. Even before such a threshold is reached, such changes can be used as an occasion to take adjustment measures to counteract a deterioration of the work result due to wear. Such adjustment measures can be, for example, changing the composition and/or temperature of the working fluid and/or changing the wire speed and/or other process-specific parameters.

Cut-off operations that take place after a change in the saw system represent a special case. Such a change in the saw system occurs, for example, when there is a change of wire guide rollers, mechanical adjustments to the wire saw, or changes in physical or chemical properties of the working fluid. The first cut-off operations after a change of the saw system, the so-called initial cuts, preferably consist of 1 to 5 cut-off operations. For initial cuts, the shape deviation is preferably determined by comparing an average shape profile of slices with the reference shape profile, wherein the average shape profile of slices produced by the same wire saw in the course of one or more initial cuts made before the saw system was changed is used.

A preferred proposal is to additionally provide control of the temperature of the workpiece during each of the cut-off operations, more specifically by wetting the workpiece with a cooling medium (ingot cooling, IC). According to a variant of the first, second and third embodiments, control is performed by means of a closed control loop, wherein the temperature of the workpiece forms the controlled variable and the temperature of the cooling medium forms the manipulated variable of the control loop. The reference variable of the control loop is preferably a constant temperature. The cooling medium is preferably a fluid or the working fluid used in lap slicing or grind slicing. By controlling the temperature of the workpiece, it is possible to limit shape deviations of the slices caused by thermal expansion of the workpiece. The control loop may be implemented, for example, as described in US 2002/0 174 861 A1.

According to a preferred variant of the first, second and third embodiments, the temperature of the workpiece is controlled according to the second temperature profile, which specifies the temperature of the cooling medium in dependence on the depth of cut. The second temperature profile correlates with the third correction profile, which is opposed to the shape deviation. The temperature of the cooling medium influences the elongation of the workpiece and thus the relative position of the workpiece and the wire sections of the wire array. The change in length of the workpiece is brought about deliberately by control of the temperature of the workpiece in order to reduce the shape deviation in conjunction with the movement of the floating bearing and the workpiece.

A wire saw used in accordance with aspects of the present disclosure comprises two or more wire guide rollers. Adjustment of the temperature of the fixed bearings of the wire guide rollers can be limited to the two wire guide rollers between which the wire array is tensioned, by means of which the workpiece is fed in.

The workpiece is preferably composed of a semiconductor material such as silicon, which is in a multicrystalline or monocrystalline state. The periphery of the cross section of the workpiece is square, rectangular or circular. In the case of a workpiece of cylindrical shape, the workpiece axis extends through the center of the cylinder. The method according to an aspect of the present disclosure is suitable particularly for the production of round semiconductor wafers composed of monocrystalline silicon with a diameter of at least 200 mm, in particular at least 300 mm.

To produce semiconductor wafers from monocrystalline silicon with a diameter of 300 mm, the following matched operating parameters have proven particularly suitable, irrespective of whether operating according to the first, second or third embodiment or one of the variants thereof:
feed rate: 2.83 mm/min
amount of working fluid supplied: 38 kg/min
temperature of the working fluid: 31° C.
wire speed: 8 m/s
wire consumption: 58.3 km
wire tension: 34 N A wire saw suitable for carrying out the method according to an aspect of the present disclosure comprises a wire array 2 consisting of moving wire sections of a saw wire 3, which is tensioned in a plane between two wire guide rollers 1. During a cut-off operation, the workpiece 4 is fed through the wire array 2 along a feed direction perpendicular to a workpiece axis and perpendicular to the plane of the wire array 2 by means of an actuating device 12. In the course of this operation, the wire guide rollers 1 tensioning the wire array 2, and the workpiece 4, are each moved in an axial direction in accordance with direction arrows 10 and 11, respectively, in dependence on a first and a second correction profile. The first and the second correction profile counter a shape deviation determined before or during a cut-off operation. To determine the shape deviation during the cut-off operation, there is a kerf detector 13 for observing kerfs. Furthermore, a data processing unit 14 for creating the first, the second and, where applicable, the third correction profile is provided. The data processing unit 14 transmits to an actuating element 15 a control signal which, in dependence on the depth of cut, brings about a movement of the workpiece 4 in accordance with the second correction profile in the direction along the workpiece axis indicated by the direction arrow 11. Furthermore, a device 22 for adjusting the temperature of the workpiece 4 is provided. If the shape deviation is determined before each of the cut-off operations, the data processing device 14 transmits to the device 22 the second temperature profile, which brings about the change in length of the workpiece in accordance with the third correction profile.

Figure 2:
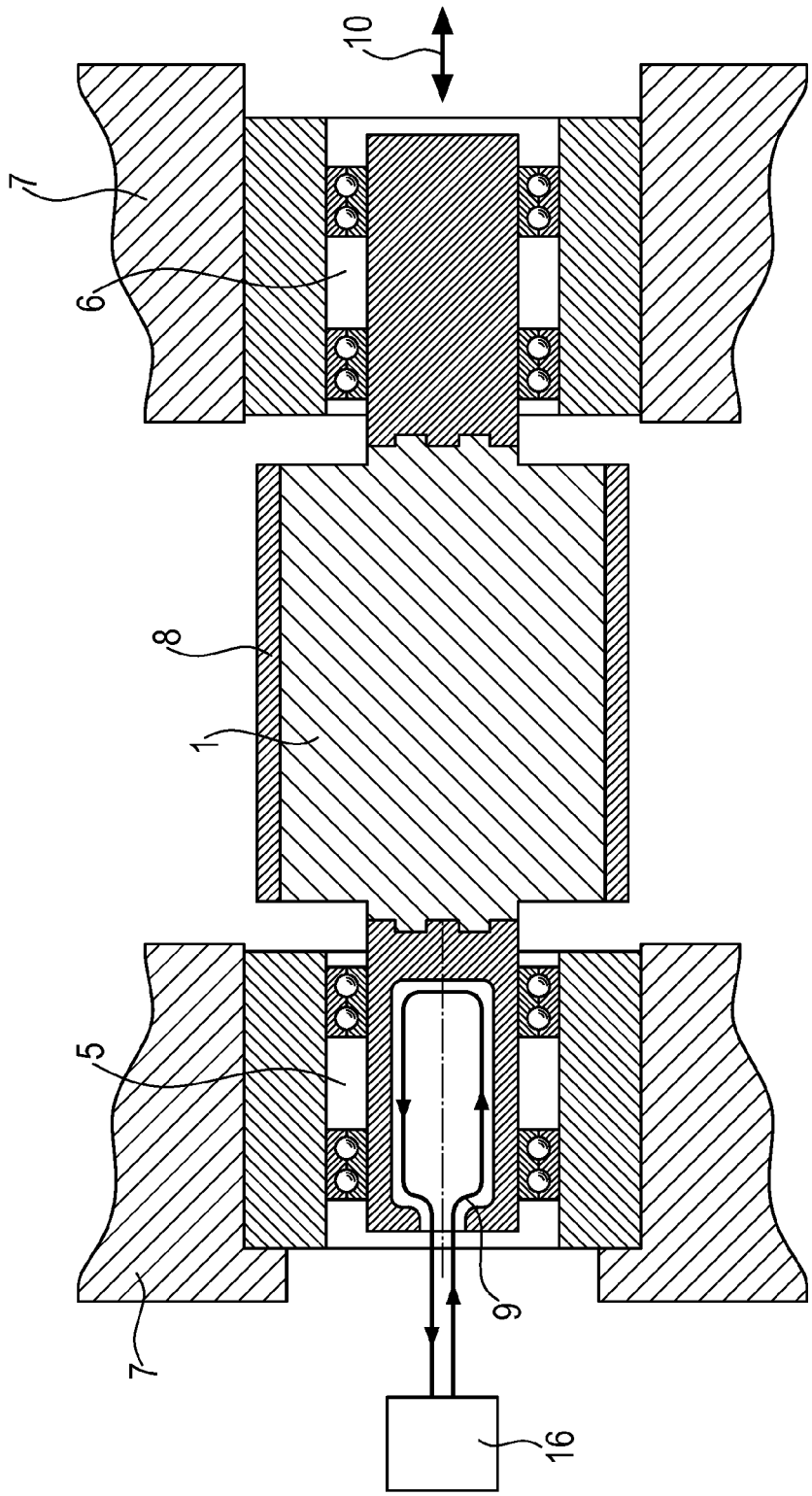
FIG. 2 shows further details of the wire saw.

As shown in FIG. 2, the wire guide roller 1 is mounted between a fixed bearing 5 and a floating bearing 6. The fixed bearing 5 and the floating bearing 6 are supported on a machine frame 7. The wire guide roller 1 has a facing 8 that is provided with grooves, in which the saw wire 3 runs. The fixed bearing 5 comprises a channel 9, through which a cooling fluid for adjusting the temperature of the fixed bearing 5 is passed. If the temperature of the fluid is increased, the thermal expansion of the fixed bearing 5 brings about an axial movement of the wire guide roller 1 in the direction of the floating bearing 6, and the floating bearing 6 moves outward in the direction, indicated by direction arrow 10, of the axis of the wire guide roller 1 relative to the machine frame 7. If the temperature of the cooling fluid is reduced, a movement of the wire guide roller 1 and of the floating bearing 6 in the opposite direction is brought about. The temperature of the cooling fluid is specified in dependence on the depth of cut by a first temperature profile, which correlates with the first correction profile. A control unit 16, which is connected to a heat exchanger and a pump, ensures that the fluid passed through the fixed bearing 5 has the temperature required by the respective first temperature profile when a certain depth of cut is reached. The data processing unit 14 transmits to the control unit 16 the first temperature profile, which brings about a movement of the floating bearings in accordance with the first correction profile.

Figure 3:
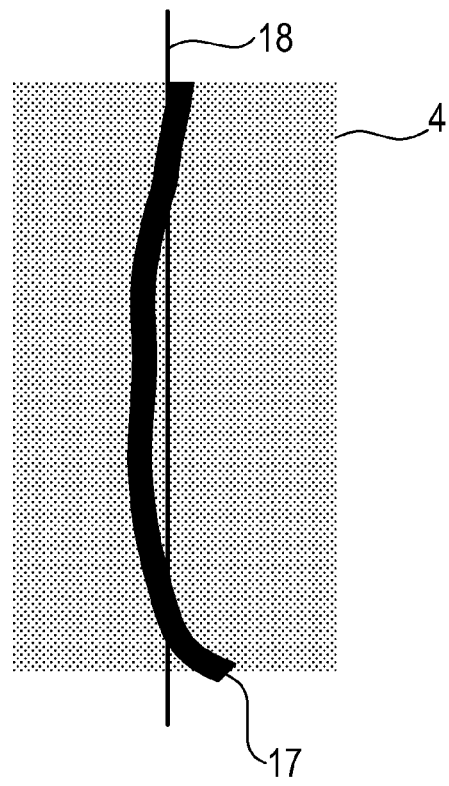
FIG. 3 shows the course of a kerf through the workpiece and an envisaged course represented by a reference trajectory.

FIG. 3 shows the course of a kerf 17 through the workpiece 4 and an envisaged course represented by a reference trajectory 18. The respective deviation of the line through the center of the kerf from the reference trajectory corresponds to an overall correction profile, which can be divided in the form of the first and the second and, where applicable, the third correction profile.

Figure 4:
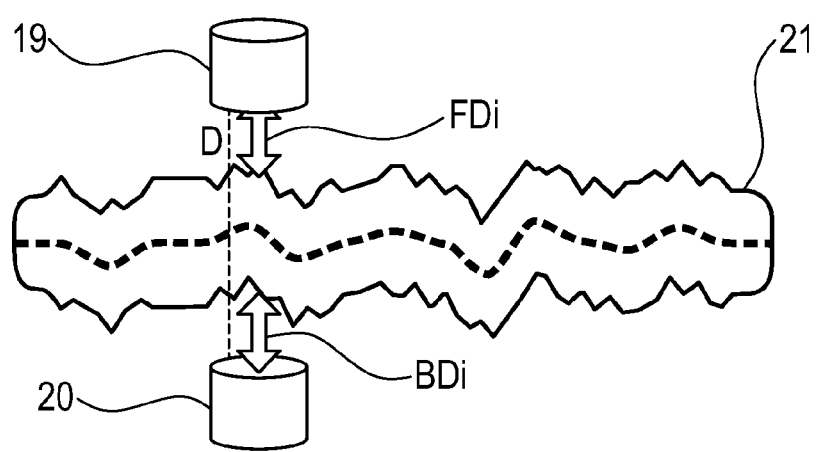
FIG. 4 shows the arrangement of a slice between two sensors for determining the shape deviation thereof before a cut-off operation.

FIG. 4 shows the arrangement of a slice between two sensors 19, 20 for determining a shape deviation thereof before a cut-off operation. The sensors 19, 20 measure the distance FDi of the upper sensor 19 from the front side of the slice 21 and the distance BDi of the lower sensor 20 from the rear side of the slice 21 at certain positions i along the diameter of the slice 21 in the feed direction in accordance with certain depths of cut. The shape profile of the slice is the line which connects the measured values si calculated in accordance with the rule si=D−(FDi−BDi), where D denotes the distance between the sensors. The shape deviation of the slice is obtained by comparing the shape profile of the slice with a reference shape profile. The deviation from the reference shape profile in dependence on the depth of cut corresponds to the overall correction profile, which is divided between WGTC and IPC in the form of the first and the second correction profile.

Figure 5:
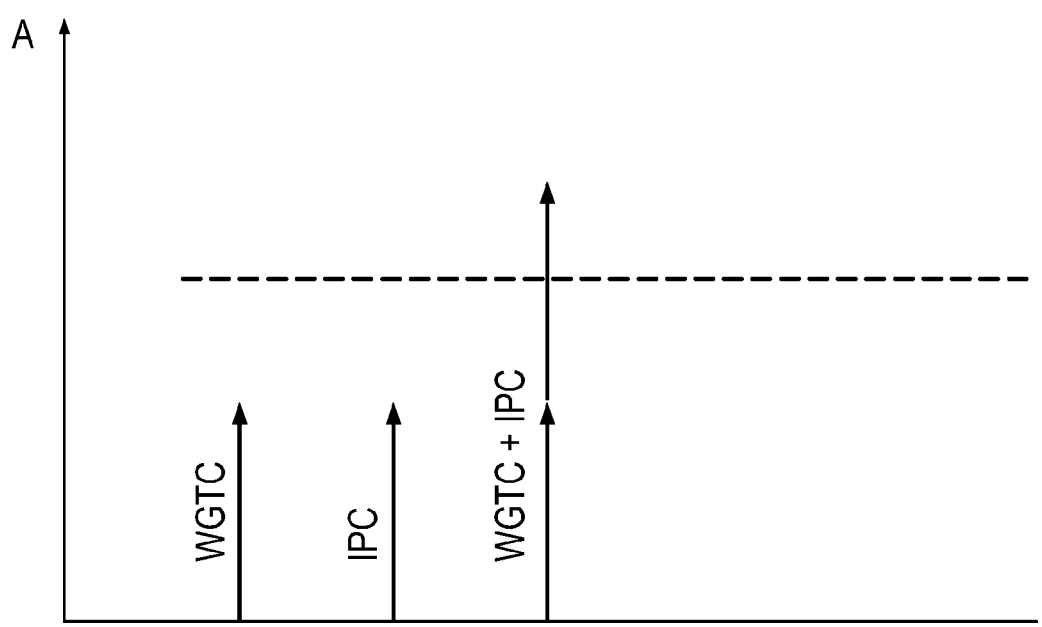
FIG. 5 shows the advantage obtained when the amplitudes of WGTC and IPC are added.

FIG. 5 shows the advantage obtained when the amplitudes of WGTC and IPC are added. If the overall correction profile requires a travel of amplitude A of the order of the dashed line, it would not be possible for this travel to be accomplished by means of WGTC or IPC individually since the achievable travel with the respective individual measure is not sufficient. Only the combination of WGTC and IPC makes this possible.

Figure 6:
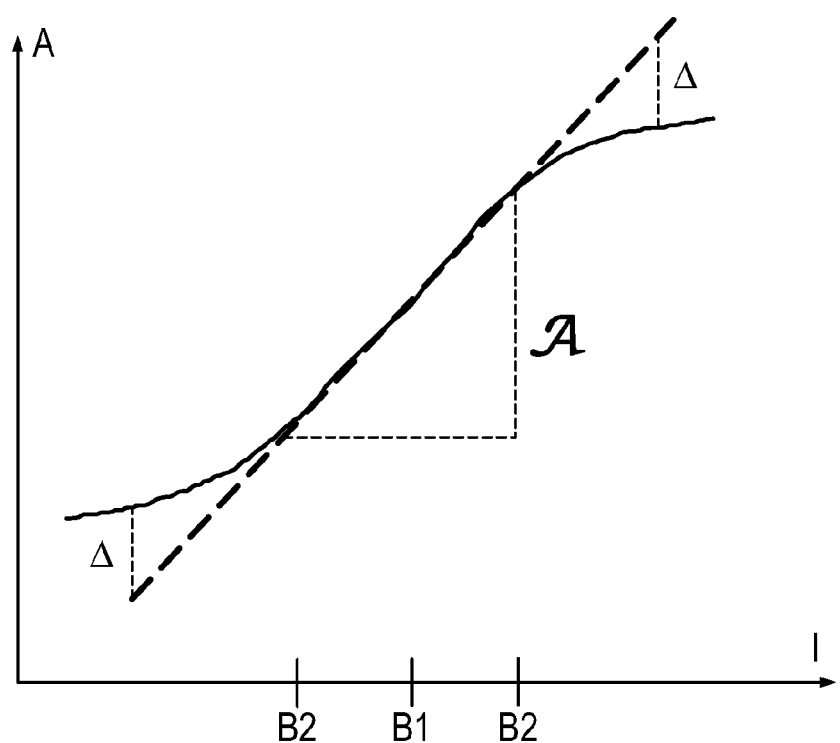
FIG. 6 shows the range within which an amplitude of $\mathcal{A}$ the movement is linearly dependent on the variable bringing about the movement.

FIG. 6 shows that, in the range B2 with the rest position B1, the amplitude $\underline{A}$ of the movement is linearly dependent on the variable (input, I) bringing about the movement. Outside this range, deviations from linear behavior occur, resulting in Δ errors. By combining WGTC and IPC, the range B2 in which the overall system reacts linearly is increased.

Figure 7:
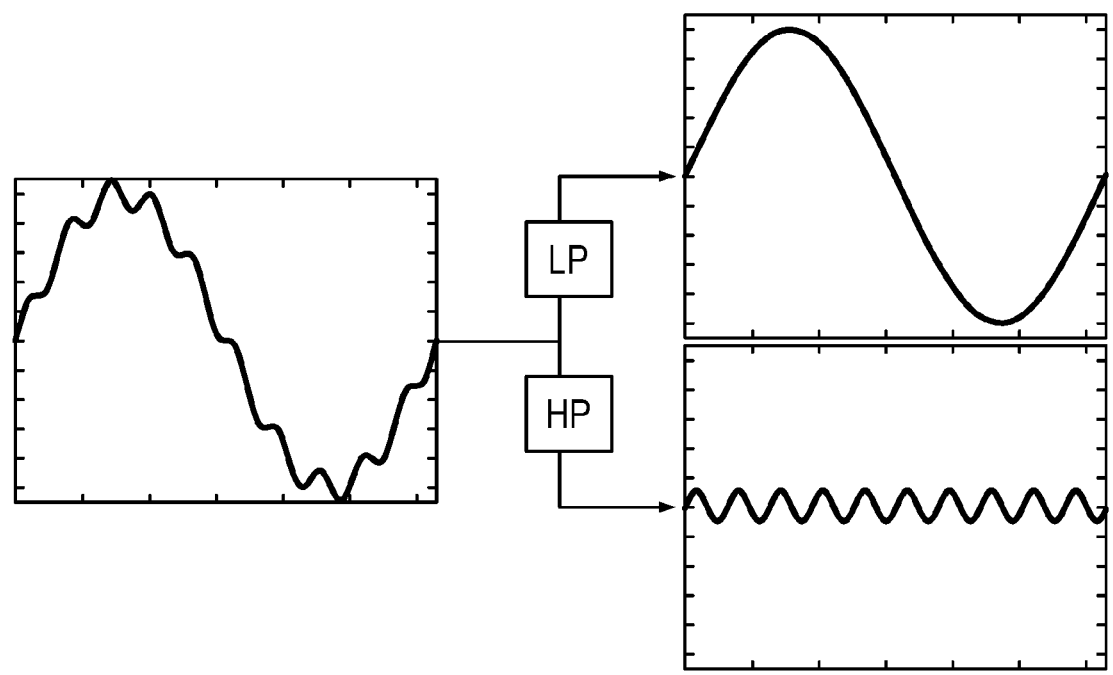
FIG. 7 shows an advantageous division of the overall correction profile between WGTC and IPC.

FIG. 7 shows an advantageous division of the overall correction profile between WGTC and IPC, which consists of counteracting low-frequency shape deviations by means of WGTC and the first correction profile and high-frequency shape deviations by means of IPC and the second correction profile. For this purpose, use is preferably made of a crossover, which, by means of a low-pass filter (LP) and a high-pass filter (HP), assigns low-frequency portions of the shape deviation to correction by means of WGTC and high-frequency portions of the shape deviation to correction by means of IPC.

Figure 8:
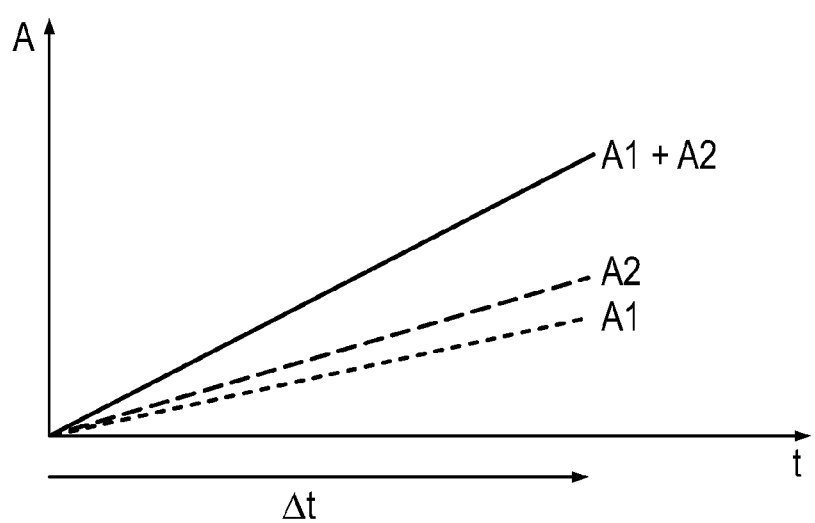
FIG. 8 shows that a larger travel per unit time can be brought about by combining WGTC and IPC.

FIG. 8 shows that by means of the combination of WGTC and IPC a larger total amplitude A2+A1 per unit time Δ can be achieved because the movement of the floating bearings and the workpiece is carried out by two independent actuators. When using WGTC or IPC alone, only one amplitude of A1 and A2, respectively, is possible in this time unit.

Figure 9:
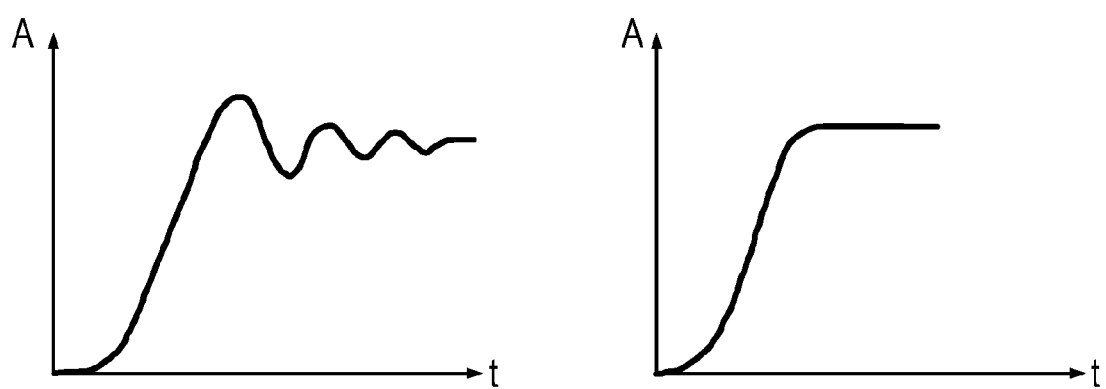
FIG. 9 shows how an advantageous division of the overall correction profile between WGTC and IPC damps the overshoot of the amplitude which would be observed if WGTC were used as the only measure.

FIG. 9 shows how an advantageous division of the overall correction profile between WGTC and IPC damps the overshoot of the amplitude A over time t (right-hand diagram) which would be observed if WGTC were used as the only measure (left-hand diagram).

Figure 10:
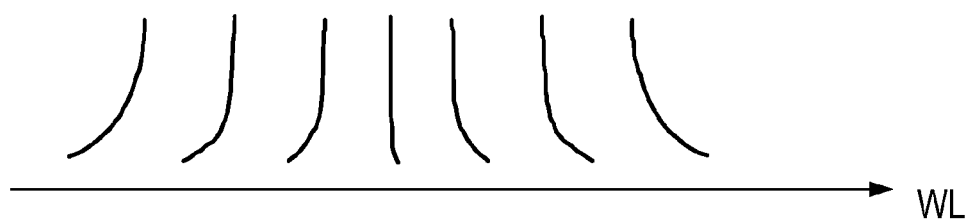
FIGS. 10, 11, and FIG. 12 show the profile of kerfs in a qualitative way.

FIG. 10 shows qualitatively the course of kerfs through a workpiece over the workpiece length WL. Such a course can be expected if a cut-off operation is performed without using WGTC, IPC, and IC, and the operating parameters are then optimized to obtain particularly flat slices. The slices are nevertheless comparatively uneven, and the form of the unevenness is also particularly dependent on the position of the respective slice in the workpiece.

Figure 11:
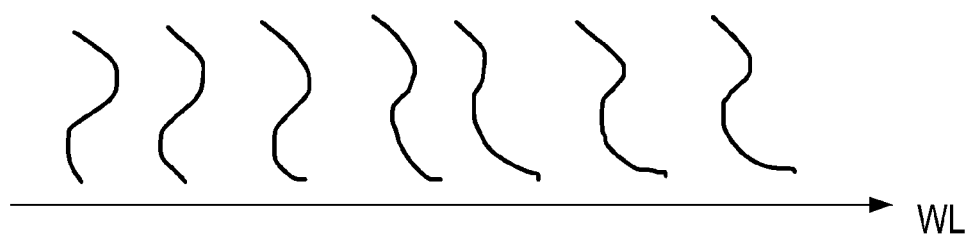

FIG. 11 shows qualitatively a corresponding course of kerfs which can be expected when a cut-off operation is carried out without the use of WGTC, IPC and IC, and the operating parameters are then adapted for use in conjunction with the use of WGTC and/or IPC and, where applicable, IC, as a departure from the procedure that leads to FIG. 10. Although these slices are less flat, the pronounced dependence of the shape of each slice on its position in the workpiece is no longer observed.

Figure 12:
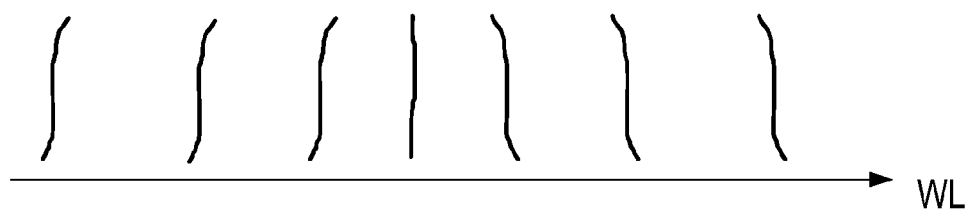

FIG. 12 shows qualitatively a corresponding course of kerfs that can be expected when a cut-off operation is performed according to an aspect of the present disclosure, i.e. WGTC is performed with the matched operating parameters, IPC is performed with the matched operating parameters, or WGTC and IPC are performed with the matched operating parameters, preferably in combination with IC in each case. The slices obtained are particularly flat, regardless of their position in the workpiece.

The above description of illustrative embodiments is to be understood as being exemplary. The disclosure made thereby enables a person skilled in the art, on the one hand, to understand aspects of the present disclosure and the advantages associated therewith and also comprises, on the other hand, alterations and modifications to the described structures and methods that are obvious within the understanding of a person skilled in the art.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS EMPLOYED 1 wire guide roller
2 wire array 3 saw wire
4 workpiece
5 fixed bearing
6 floating bearing
7 machine frame
8 facing
9 channel
10 direction arrow
11 direction arrow
12 actuating device
13 kerf detector
14 data processing unit
15 actuating element
16 control unit
17 kerf
18 reference trajectory
19 upper sensor
20 lower sensor
21 slice
22 device for adjusting the temperature of the workpiece

The invention claimed is:

1. A method for cutting a multiplicity of slices, using a wire saw, from workpieces during a sequence of cut-off operations divided into initial cuts and follow-on cuts, the wire saw comprising a wire array of moving wire sections of a saw wire and an actuating device, the wire array being tensioned in a plane between two wire guide rollers, each of the two wire guide rollers being supported between a fixed bearing and a floating bearing, the method comprising:
during each of the cut-off operations, feeding a respective workpiece, of the workpieces, at a feed rate, using the actuating device, through the wire array along a feed direction perpendicular to a workpiece axis and perpendicular to the plane of the wire array in the presence of a working fluid and hard materials, which act abrasively on the workpiece, the feeding of the workpiece through the wire array further comprising:
during each of the cut-off operations, feeding the workpiece through the wire array with simultaneous axial movement of the floating bearings by adjusting a temperature of the fixed bearings with a cooling fluid in accordance with a specification of a first temperature profile, which specifies a temperature of the cooling fluid in dependence on a depth of cut and correlates with a first correction profile, which specifies a travel of the floating bearings in dependence on the depth of cut;
determining a shape deviation during each of the cut-off operations and/or before each of the cut-off operations; and
in dependence on the depth of cut, setting operating parameters comprising at least one of the feed rate, an amount of working fluid fed to the wire array per unit time, a temperature of the working fluid, a wire speed, a wire consumption per cut-off operation, or a wire tension.

2. The method as claimed in claim 1, the method further comprising, during each of the cut-off operations, feeding the workpiece through the wire array while controlling the temperature of the workpiece by wetting the workpiece with a cooling medium.

3. The method as claimed in claim 1, wherein the feed rate is no less than 2.6 mm/min and no more than 4.25 mm/min.

4. The method as claimed in claim 1, wherein the amount of working fluid supplied to the wire array per unit time is no less than 15 kg/min and no more than 42 kg/min.

5. The method as claimed in claim 1, wherein the temperature of the working fluid is no less than 20° C. and no more than 34° C.

6. The method as claimed in claim 1, wherein the wire speed is no less than 6 m/s and no more than 14 m/s.

7. The method as claimed in claim 1, wherein the wire consumption per cut-off operation is no less than 50 km and no more than 72 km.

8. The method as claimed in claim 1, wherein the wire tension is no less than 25 N and no more than 35 N.

9. The method as claimed in claim 1, wherein the shape deviation is measured during each of the cut-off operations by comparing a position of a line through the center of at least one kerf with the position of a reference trajectory.

10. The method as claimed in claim 1, wherein a maintenance measure is initiated instead of the respective cut-off operation upon determining that the shape deviation determined before the respective cut-off operation reaches or exceeds a defined threshold.

11. A method for cutting a multiplicity of slices, using a wire saw, from workpieces during a sequence of cut-off operations divided into initial cuts and follow-on cuts, the wire saw comprising a wire array of moving wire sections of a saw wire and an actuating device, the wire array being tensioned in a plane between two wire guide rollers, each of the two wire guide rollers being supported between a fixed bearing and a floating bearing, the method comprising:
during each of the cut-off operations, feeding a respective workpiece, of the workpieces, at a feed rate, using the actuating device, through the wire array along a feed direction perpendicular to a workpiece axis and perpendicular to the plane of the wire array in a presence of a working fluid and hard materials, which act abrasively on the workpiece, the feeding of the workpiece through the wire array further comprising
feeding the workpiece through the wire array while simultaneously moving the workpiece along the workpiece axis, in accordance with a specification of a second correction profile, which specifies a travel of the workpiece, wherein the second correction profile is opposed to a shape deviation;
determining the shape deviation during each of the cut-off operations and/or before each of the cut-off operations; and
in dependence on the depth of cut, setting operating parameters comprising at least one of the feed rate, an amount of working fluid fed to the wire array per unit time, a temperature of the working fluid, a wire speed, a wire consumption per cut-off operation, and a wire tension.

12. A method for cutting a multiplicity of slices, using a wire saw, from workpieces during a sequence of cut-off operations divided into initial cuts and follow-on cuts, the wire saw comprising a wire array of moving wire sections of a saw wire and an actuating device, the wire array being tensioned in a plane between two wire guide rollers, each of the two wire guide rollers being supported between a fixed bearing and a floating bearing, the method comprising:
during each of the cut-off operations, feeding a respective workpiece, of the workpieces, at a feed rate, using the actuating device, through the wire array along a feed direction perpendicular to a workpiece axis and perpendicular to the plane of the wire array in the presence of a working fluid and hard materials, which act abrasively on the workpiece, the feeding of the workpiece through the wire array further comprising:

during each of the cut-off operations, feeding the workpiece through the wire array with simultaneous axial movement of the floating bearings by adjusting a temperature of the fixed bearings with a cooling fluid in accordance with a specification of a first temperature profile, which specifies a temperature of the cooling fluid in dependence on a depth of cut and correlates with a first correction profile, which specifies a travel of the floating bearings in dependence on the depth of cut; and feeding the workpiece through the wire array while simultaneously moving the workpiece along the workpiece axis in accordance with a specification of a second correction profile, which specifies a travel of the workpiece, wherein the first correction profile and the second correction profile are opposed to a shape deviation;

determining the shape deviation during each of the cut-off operations and/or before each of the cut-off operations; and in dependence on the depth of cut, setting operating parameters comprising at least one of: the feed rate, a amount of working fluid fed to the wire array per unit time, a temperature of the working fluid, a wire speed, a wire consumption per cut-off operation, and a wire tension.

* * * * *